June 4, 1935.  W. O. MITSCHERLING  2,003,898

TREATMENT OF HYDROCARBONS

Filed April 28, 1931    2 Sheets-Sheet 1

INVENTOR
WALDEMAR O. MITSCHERLING
BY
Watson, Bristol, Johnson & Leavenworth
ATTORNEYS

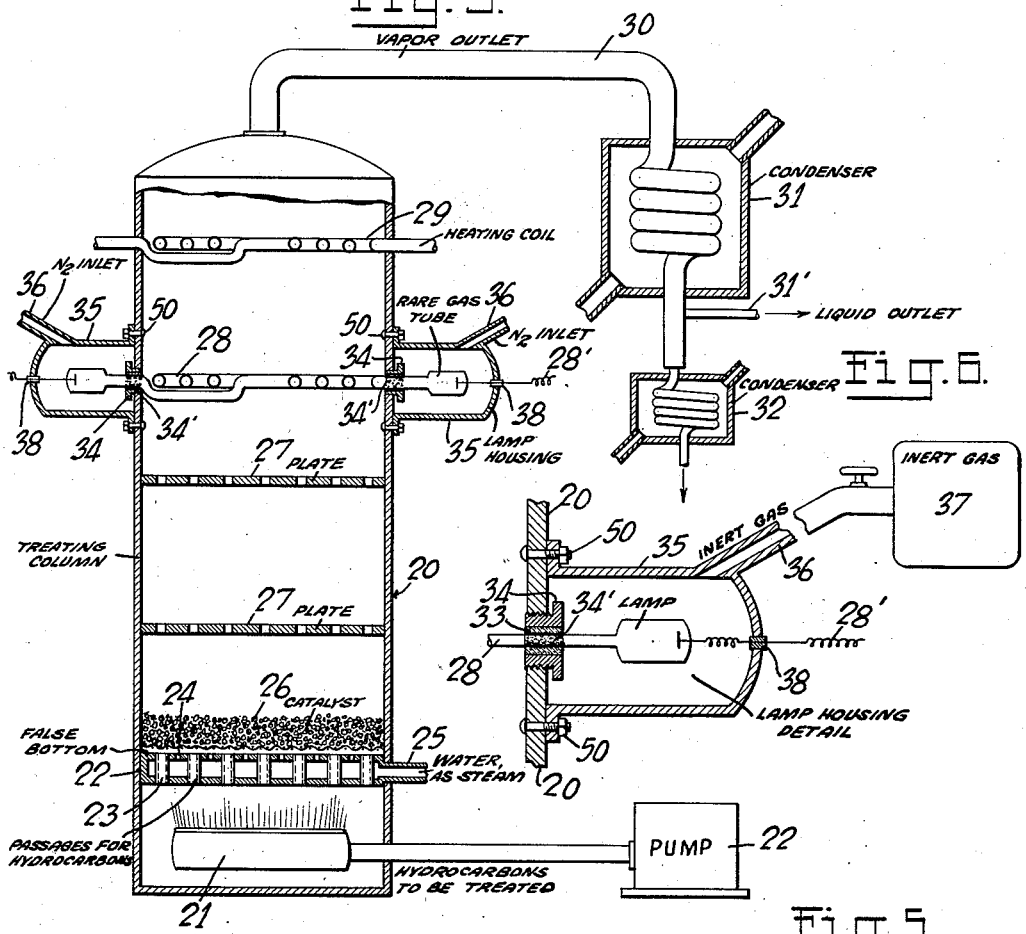

Patented June 4, 1935

2,003,898

UNITED STATES PATENT OFFICE 2,003,898

TREATMENT OF HYDROCARBONS

Waldemar O. Mitscherling, Bridgeport, Conn., assignor to Neon Research of Connecticut, Inc., Bridgeport, Conn., a corporation of Connecticut Application April 28, 1931, Serial No. 533,406

35 Claims. (Cl. 204—31)

This invention relates to the treatment of hydrocarbons and more particularly of aliphatic hydrocarbons, hydrocarbon derivatives, and hydrocarbon compounds including alkyl groups attached to aryl groups, (hereinafter referred to for brevity as "aliphatic hydrocarbon compounds"), to form degradation products and/or oxidation products thereof and has as a general object a provision of novel processes and means for accomplishing such treatment in a convenient, efficient and economicial manner. The expressions "degradation" and "degrading" as used in the specification and claims denote a depolymerization or simplification of the hydrocarbon body or molecule resulting in the formation of a product or products having a less complex molecular structure or lower molecular weight and a lower boiling point.

A further object of the invention is to provide processes and means for such treatment including the subjection of aliphatic hydrocarbons to the radiations of a rare gas lamp preferably of the positive column type such as, for example, a neon tube.

A particular object of the invention is to subject aliphatic hydrocarbons (either pure or mixtures) to the radiations of a rare gas lamp such as a neon lamp, in a manner and for a time sufficient to lower the boiling point of the whole of the material treated or of a particular portion thereof, and/or simultaneously or alternatively to form oxidation products thereof as desired.

A more specific object of the invention is to provide processes and means for subjecting such materials to the radiations of a neon lamp in the presence of an oxidizing or reducing catalytic material to form alcohols or ketones therefrom.

A further object of the invention is to provide novel catalytic materials suitable for use as aforesaid.

Other objects of the invention are in part obvious and will in part appear hereinafter.

The invention accordingly comprises the several steps and the relation of one or more of such steps with respect to each of the others, and the apparatus and means embodying features of construction, combinations of elements and arrangement of parts which are adapted to effect such steps, all as exemplified in the following detailed disclosure. The scope of the invention will be indicated in the claims.

For a fuller understanding of the nature and objects of the invention reference should be had to the following detailed description taken in connection with the accompanying drawings, in which:

Fig. 3 is an elevation view partly in vertical section showing a preferred form of apparatus for accomplishing a treatment similar to that in Fig. 1, but in vapor phase;

Figs. 4 and 5 are perspective views and Fig. 6 is a vertical sectional view, each showing details of construction of the apparatus shown in Fig. 3;

As indicated in the above brief description of the drawings and as will be readily apparent to one skilled in the art upon reading the more detailed description which follows, the novel processes comprising the present invention contemplate the treatment of aliphatic hydrocarbons, and also contemplates the treatment of these hydrocarbons in either liquid or vapor (including gaseous) phase; and the processes (according to the construction of the apparatus used) may be either of the batch-type or continuous type.

Figure 1:
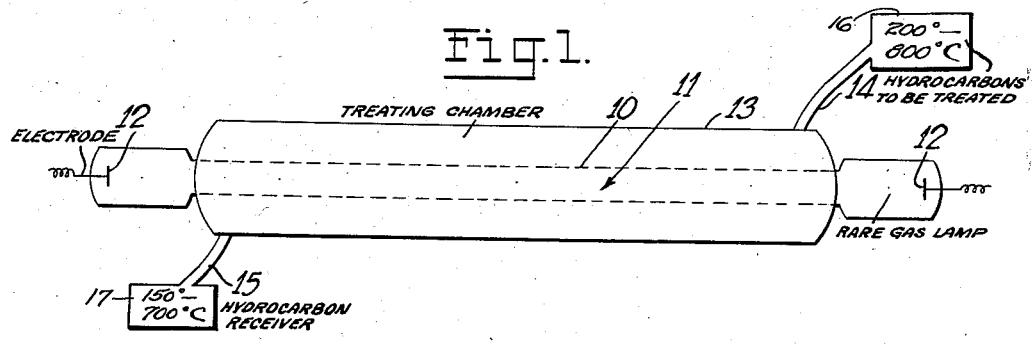
Fig. 1 shows side elevational view in part diagrammatic showing a simple form of apparatus adapted for continuous treatment of complex aliphatic hydrocarbons to form degradation products thereof.

Referring more particularly to the drawings, in Fig. 1 is shown a simple embodiment of apparatus in which the rare gas tube 10 of glass or the like containing a rare gas 11, (neon, for example), and having electrodes 12 at each of its ends, attached to a source A. C. potential, and it is surrounded by a non-conducting jacket 13 through which, as the tube 10 is operated, the liquid or vapor to be treated is slowly passed by means of an inlet 14 and an outlet 15. Fig. 1 also includes a diagrammatic disclosure of a supply tank 16 containing a material to be treated and a receiving tank 17 for receiving the material after treatment; the supply tank 16 in the embodiment shown containing a complex aliphatic hydrocarbon mixture commonly known as "gas oil" and having a boiling range of from 200°–800° C., and the tank 17 receiving the degradation products of the gas oil the boiling range of which has been reduced by treatment to 150°–700° C., both as indicated by the figures showing the temperature ranges.

Figure 2:
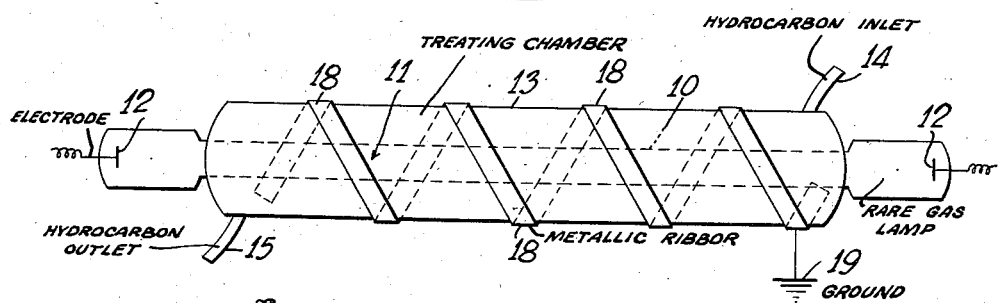
Fig. 2 is a similar view of a modified form of the apparatus shown in Fig. 1.

In Fig. 2 is shown an apparatus identical with the embodiment shown in Fig. 1 except that the jacket 13 is surrounded by a metallic member 18 which, in a preferred form, only partially covers the jacket 13 and is in the form of a coil of lead or the like which is grounded as indicated at 19. When using this form of apparatus I have found that instead of lowering the entire range of the boiling point of gas oil, for example, the degradation of the hydrocarbons is accomplished largely in the middle range, whereby when the treated material is subjected to an Engler distillation test the curve shows a marked increase in the amount of material boiling between the range of 250° and 300° C.

In Fig. 3 is shown an embodiment of apparatus adapted for continuous treatment of a mixture of aliphatic hydrocarbons, in which there is provided a vessel or column 20 of copper or the like into the bottom of which the oil, for example, is introduced through a spray head 21 at a temperature of about 400° C., and under a pressure of about 70 lbs. attained through the medium of a pump 22.

In this column 20 a pressure of about 200 millimeters of mercury is maintained by any suitable means, (not shown) whereby the oil introduced through the spray head 21 is instantly vaporized. Immediately above the spray head 21 is provided a double walled plate 22 which is shown in detail in Fig. 4 and which is provided with a plurality of tubular passages 23 through which the vaporized oil freely passes and which has its upper wall 22' provided with a plurality of small openings 24 through which moisture supplied at 25 is intimately admixed with the vaporized oil.

Above the plate 22 is situated a filter bed 26 which may be composed of any suitable broken and preferably porous material such as, for example, cracked pumice stone, that will serve to strip out or break up any large particles of oil which may tend to rise through the column 20 and to further mix the vapors. If desired, the pumice stone may be impregnated with spongy copper in a manner to be described hereinafter.

Above the filter bed 26 the column 20 is preferably provided with one or more baffle plates 27 which are provided with openings and serve further to intimately admix the vaporized oil and moisture and above these baffle plates is located a rare gas tube 28 such as, for example, a neon tube which is preferably in coiled form as shown particularly in Fig. 5. Finally at the top of the column there is preferably provided a heating coil 29 which is kept at a temperature of around 212° C., for example, and serves to prevent an undue amount of refluxing in the column. It will, of course, be apparent that the heating coil 29 may be otherwise situated for the same purpose or that a plurality of such coils may be used when necessary. When treating a normally gaseous hydrocarbon material the use of such heating coil may be dispensed with.

At its top the column 20 is provided with a take-off pipe 30 which leads to one or more condensers. As shown, the apparatus is preferably provided with a primary condenser 31 which, when treating gas oil, is maintained at a temperature of around 80° C., and a secondary condenser 32 which is preferably maintained at a temperature of about 14° C. Each of these condensers operate to condense the treated vaporized oil and water and if desired the liquid condensed by the primary condenser 31 may be taken off as indicated diagrammatically at 31' before the residual vapors are passed to the secondary condenser 32.

The liquids condensed in treating gas oil by any of the methods and in any of the apparatus show in Figs. 1 to 3 inclusive may then be distilled and the gasoline fraction recovered therefrom, whereupon the residue may be cracked for the further production of gasoline by any desired method. By the use of the apparatus in the manner shown the total recovery of Government standard gasoline from gas oil can be increased by as much as 15% or more over that otherwise produced by the same cracking process. The disclosure of the condensers in Fig. 3 is merely for the purpose of simplicity of illustration and it is, of course, to be understood that other means of recovery of the treated products may be used without departing from the spirit of the invention.

Aliphatic hydrocarbons are, in general, highly inflammable, and in treating them in an apparatus such as shown in Fig. 3, there might be danger of an explosion should the mixture become ignited either by an accidental spark or by the cracking or breaking of the neon tube. To eliminate this danger, and to allow for differences in expansion characteristics, the gasket through which the ends of the neon tube 28 pass are preferably constructed as shown in detail in Fig. 6. Around the neon tube 28 is disposed a glass or porcelain insulator 33 which is enclosed within a bushing 34 that screws into or is otherwise suitably joined to the column 20 and closely surrounds the neck of the neon tube 28. Held within the bushing 34 is a suitable non-conducting viscous mixture such as, for example, a pasty mixture 34' of glycerine and barium sulphate which minimizes leakage of gas about the bushing and into the column 20, and over the entire structure and the end of the neon tube is disposed a gas-tight sheath 35. This sheath is initially evacuated and is then filled with nitrogen gas or other inert gas or vapor through an opening 36 which is thereafter continuously attached to a source of such gas as shown at 37. The lead wire 28' to the electrode of the neon tube, (which is attached to a source of A. C. potential), passes out of the sheath 35 through a suitable insulator 38 and, as will be readily understood by one skilled in the art, as a result of such a construction if any gas leaks into the column 20 it will be an inert gas and will not form an explosive mixture with the hydrocarbon being treated.

Figures 7, 8:
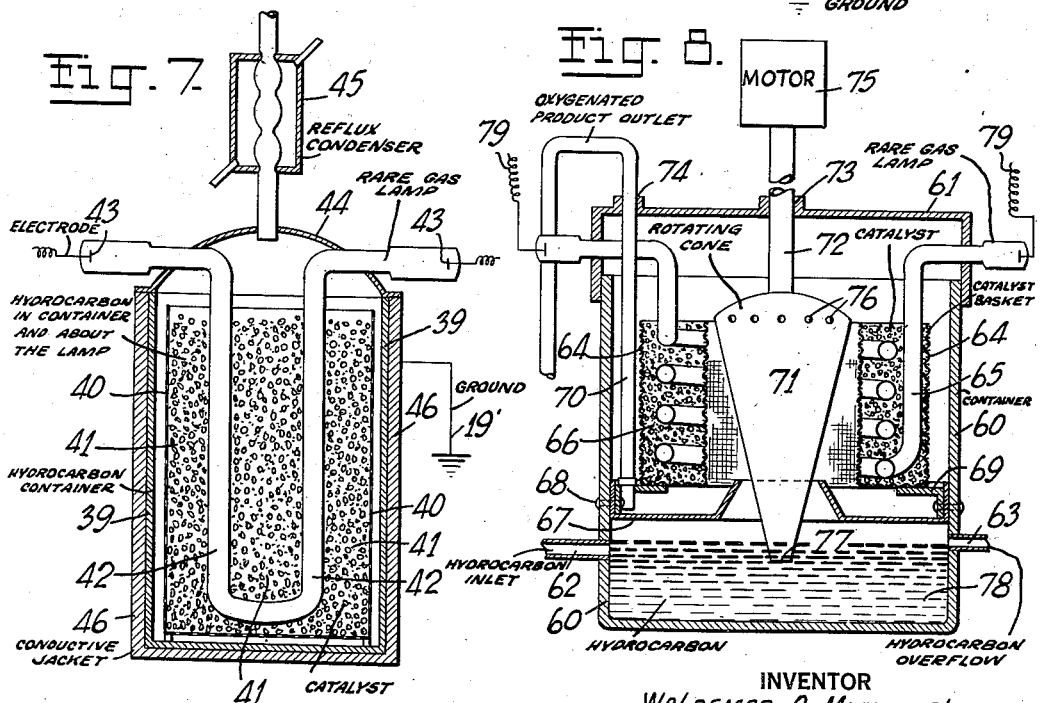
Fig. 7 is a vertical sectional view of an oxidation or reduction apparatus.
Fig. 8 is a vertical sectional view of another form of apparatus suitable for effecting oxidation or reduction.

In Fig. 7 is shown an apparatus of the batch-type which is suitable for the treatment of aliphatic hydrocarbon compounds to produce products such as alcohols, or ketones, although it is to be understood that the present invention contemplates also the carrying out of such treatment in a continuous type of apparatus. In the embodiment shown there is provided a container 39 of non-conducting material such as glass or the like in which is placed a foraminous member 40 for holding the catalyzing material 41; the member 40 being preferably formed of metallic material such as, for example, nickel. Disposed in the catalyzing material is a U-shaped or coiled rare gas tube 42, such as, for example, a neon tube which is provided with electrodes 43 and a source of A. C. potential, and the container 40 is filled to a suitable height with the material to be treated. When treating volatile liquid hydrocarbons to produce volatile products such as alcohols, the container 39 is suitably covered as shown at 44 and is provided with a reflux condenser 45. It is also preferably surrounded by a layer of mercury or other suitable conducting material 46 which is either grounded or has a low potential, for example about 5 volts, applied thereto at points opposed to and adjacent the ends of the neon tube; the neon tube preferably being operated at a high potential as, for example, about 15,000 volts and the polarity of the adjacent electrode of the neon tube being opposite to that of the conducting material. Also, if desired, the metallic holder 40 for the catalyzing material 41 may be grounded or may have a low potential applied thereto at points adjacent the ends of the tube, in which case the polarity should be like that of the adjacent electrodes of the neon tube.

If desired, the member 46 may be omitted although the apparatus shown is found to give a more rapid and perhaps a more complete action than it does without the member 46, although it is to be understood that in any case the treatment may be carried on to the degree and for the formation of the compounds desired.

Fig. 8 illustrates another form of apparatus which is suitable for effecting treatment of aliphatic hydrocarbons whether as a batch or as a continuous operation. The apparatus comprises a container 60 which may be of metal or a nonconducting material and having its upper end closed by a cover or cap 61. The container is provided with an inlet 62 and an outlet or overflow 63, the overflow being so positioned as to maintain the height of a liquid 78 in the bottom of the container at a certain predetermined level. This outlet also prevents the liquid from rising to an undue height within the container.

A foraminous holder 64 is preferably positioned near the top of the container and may be constructed of a perforated metal, as nickel. The holder may be in the form of an annulus and within the holder is positioned a rare gas tube, as a neon tube, 65. Within the holder and surrounding the neon tube is a catalytic material 66 which may be either of an oxidizing or a reducing nature, as hereinafter more fully described. Positioned beneath the holder is a collecting chamber 67 which may preferably be of annular form and is fixedly attached to the walls of the container as by means of bolts 68 which likewise attach to the walls a supporting member 69 for the holder 64. Leading from the collecting chamber is a pipe or conduit 70 for the purpose of withdrawing liquid from the collecting chamber. This pipe may be in the form of, and act on the principle of a siphon.

Centrally disposed within the container, positioned within the annular holder 64 and collecting chamber 67 and extending beneath the surface of the liquid 78 is a pump 71. This pump may be of conical shape as shown, although it will be readily understood that other types of pumps may be employed. The pump is mounted upon a shaft 62 passing through an opening 73 in the cover 61 and is actuated by a suitable source of power, as a motor 75. The apex of the cone is provided with an orifice 77 and at its greatest circumference the periphery is provided with a number of orifices 76. The cover 61 has also an opening 74 through which the pipe 70 passes. The openings 73 and 74 are preferably closed. They may, however, be open and when open there may be located with respect to such openings a suitable means (not shown) for preventing the escape of vapors as for example, the positioning of a paddle or propeller immediately adjacent to the opening 73 upon shaft 72. The energy is supplied to the neon tube by means of leads 79.

In operation the hydrocarbon to be treated may be introduced through the inlet 62 until the container is filled to the level of the outlet 63 thereby covering the lower end or orifice 77 of the pump. The rapid rotation of the pump 71 causes the liquid to rise along its inner surface. Upon reaching the orifices 76 the liquid is discharged therethrough and passed to, and over the catalytic material and neon tube contained within the holder 64. The treated liquid collects in the chamber 67 beneath the holder and may be withdrawn therefrom by the conduit 70. The liquid thus withdrawn, if sufficiently treated by a single pass, is then ready either for utilization per se or after rectification to separate it into the desired fractions. However, when the treatment is not sufficient in a single passage of the liquid, it may be repassed, either before or after further processing.

If the amount of hydrocarbon contacted with the catalytic material is such as to accomplish the desired treatment thereof by a single passage, the process may be made continuous by introducing the hydrocarbon to be treated continuously through the inlet 62 at such a rate as to permit the treatment of the desired amount of hydrocarbon, and for the predetermined overflow through the outlet 63. In the event that the treatment is incomplete by single contact with the catalyst, the hydrocarbon may be withdrawn from the collecting chamber, and if desired, after separation of certain constituents, returned in a continuous manner to the liquid in the base of the container.

It will be realized, of course, that the liquid may be passed to, or contacted with the catalyst and neon tube by means other than that particularly shown in the embodiment illustrated in Fig. 8. Thus, the reservoir instead of forming a part of the container may be positioned without this container and the liquid passed to the catalyst by a suitable arrangement of conduits that will be understood by those skilled in the art.

The catalytic material 41 (Fig. 7) and 66 (Fig. 8) may be formed in a variety of ways, the requirements being that it shall be generally granular in form, catalytically active and substantially non-conductive per se, and that it shall contain water and material of an oxidizing or reducing type as desired.

A preferred form of catalytic material may be prepared by treating an active carbon for example, a granular decolorizing carbon such as "Darco" which is a charcoal having marked absorptive and decolorizing properties and which is prepared by the destructive distillation of carbonaceous material, particularly lignite, by washing thoroughly; then treating with an organic acid such as acetic acid to form soluble salts with the alkaline mineral constituents thereof; thereafter again washing thoroughly; steaming out the residue of the organic acid; and then impregnating with a solution of an oxidizing substance such as sodium perborate or the like which has preferably been put into colloidal form by first boiling with a trace of gum such as agar-agar, gum arabic, or with other suitable materials such as glue, glucose or the like. In place of the perborate mentioned, other perborates or perchlorates, persulfates, percarbonates, bichromates, hydrogen peroxide or other suitable oxidizing materials may be used to impregnate the active carbon, the amount in general being about 5% of the weight of the carbon. This prepared oxidizing catalytic material is then placed while still wet into the nickel screen basket 40 and after the container 39 has been substantially filled with the material to be treated, the neon tube is operated and the oxidizing treatment carried on until the desired amount of the desired alcohol is formed. As indicated above, when treating complex hydrocarbons, a degradation tends to occur simultaneously with the formation of alcohol or ketones.

For producing ethyl alcohol from gasoline, for example, I have found it desirable to use a neon tube (e. g. 11 mm. outside diameter) with an impressed voltage of about 1,000 volts and a tube current of about 4 milliamperes, the treatment being carried on for from about 24 to 36 hours in the apparatus shown in Fig. 7, but without the member 46.

For treating more complex hydrocarbons such as kerosene, the treatment is in general the same, but the amperage or time of treatment is suitably increased and, as will be apparent to one skilled in the art, if larger capacity tubes or higher impressed voltages are used the amperage and time of treatment are varied according to the results desired.

For the production of alcohols the neon tube may, if desired, be replaced by an argon tube.

For treating hydrocarbons for depolymerization, the voltages and times of treatment may vary widely but in general I have found somewhat higher voltages say around 7,000 to 15,000 volts to give good results.

Another suitable oxidizing catalytic material can be formed, using pumice stone as a carrying material, by soaking cracked pumice stone in a copper sulphate solution; adding sufficient sodium hydroxide until the re-solution of the copper hydroxide has not quite commenced (that is, until a blue precipitate is formed, as distinguished from the initially formed green precipitate); then adding a small amount of sodium bicarbonate solution to throw back the precipitation slightly and to give a gelatinous mixture containing about 1 to 2% of copper sulphate admixed with some copper carbonate and copper hydroxide, so that the precipitate has approximately a neutral reaction and the liquid is slightly acid. In order to get this catalytic material in the most active form, the treatment must be carried out at a temperature sufficiently low to prevent the formation of a black precipitate, and I have found a temperature of 14° C. or below to be desirable. The oxidizing catalytic material so formed may be used in place of the active carbon oxidizing catalyzing material above described and likewise should be used in a wet state for the formation of alcohols.

When it is desired to form ketones, instead of alcohols, from aliphatic hydrocarbon compounds, the material used to impregnate the active carbon should be of the reducing type such as, for example, sodium acid sulphite, ferrous sulphate, nitre-cake, chlor-acetic acid, or reducing compounds which dissolve in their own water of crystallization such as, for example, the sulphocyanates. Active carbon may be impregnated with these materials, preferably in colloidal form by the use of agar-agar in the same manner as described above in connection with the oxidizing type of catalytic material and are also used in a wet state.

Another suitable form of reducing catalytic material may be prepared by thoroughly cleaning aluminum filings, as by dipping them for a moment into a solution (e. g. about 10%) of sodium hydroxide; quickly washing with distilled water; then dipping into a solution of mercuric chloride (e. g. about 0.5%); washing with water and covering the prepared aluminum with benzol or the like to exclude the air until it is used. A several times repetition of the treatment is found to improve the catalytic material.

A suitable material for use in the filter bed 26 shown in Fig. 3, in the degradation of complex aliphatic hydrocarbons, may be prepared by dipping pumice stone in the copper hydroxide precipitate formed as above described; then placing it in a Gooch crucible or the like; washing out the electrolyte; heating to about 130° C., to form black copper oxide; and finally placing the crucible over methyl alcohol whereby the copper oxide is reduced to a spongy form of metallic copper. This copper impregnated pumice stone is susceptible to oxidation and hence after preparation should be kept away from air as, for example, by covering with benzol or the like, until it is used. When thus prepared the pumice stone will carry about 6 to 7% of copper.

This copper impregnated pumice stone may also conveniently be used in place of active carbon as a carrier for the chemical oxidizing or reducing substances referred to above to form an oxidizing or reducing catalytic material. A similarly active impregnated pumice base can be prepared by soaking cracked pumice stone in a solution of nickel nitrate; adding sodium hydroxide solution to form a precipitate of nickel hydroxide; removing the pumice stone from the solution, washing out the electrolyte; and heating to about 300° C. Such nickel oxide impregnated pumice may be used in a like manner and for like purposes, as the copper impregnated pumice referred to above.

By the treatment of aliphatic hydrocarbon compounds in the presence of oxidizing catalytic materials of the type described, with a rare gas tube such as neon, I have found it possible, for example, to convert kerosene directly into ethyl, butyl, and amyl alcohols, and by using the reducing catalyzing materials I have been able to form the corresponding ketones.

It will thus be seen that by means of the present invention novel means and processes have been developed whereby aliphatic hydrocarbon compounds may be degraded, oxidized or reduced as desired, and since certain changes in carrying out the above process and in the construction set forth, which embody the invention may be made without departing from its scope, it is intended that all matter contained in the above description or shown in the accompanying drawings shall be interpreted as illustrative and not in a limiting sense. Particularly it is to be understood that in said claims ingredients recited in the singular are intended to include mixtures of such ingredients wherever the sense permits.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A process of degrading a hydrocarbon which comprises exposing said hydrocarbon to the action of radiations from a rare gas lamp until it is degraded.

2. A process of degrading an aliphatic hydrocarbon which comprises exposing said hydrocarbon to the action of a positive column rare gas lamp until it is degraded.

3. A process of degrading an aliphatic hydrocarbon which comprises exposing said hydrocarbon to the action of a positive column neon lamp until it is degraded.

4. A continuous process of degrading an aliphatic hydrocarbon which comprises passing said hydrocarbon continuously over a positive column rare gas lamp at a rate such that the hydrocarbon is degraded.

5. A continuous process of degrading an aliphatic hydrocarbon which comprises passing said hydrocarbon continuously over a positive column neon lamp operating under a potential of 7,000 to 15,000 volts, at a temperature above atmospheric and at a rate such that the hydrocarbon is degraded.

6. A continuous process of degrading an aliphatic hydrocarbon which comprises passing said hydrocarbon continuously in the vapor form over a positive column rare gas lamp operating at a potential upwards to 15,000 volts, at a temperature above atmospheric and at a rate such that the hydrocarbon is degraded.

7. A continuous process of degrading an aliphatic hydrocarbon which comprises passing said hydrocarbon continuously in vapor form over a positive column neon lamp operating at a potential upwards to 15,000 volts, at a temperature above atmospheric and at a rate such that the hydrocarbon is degraded.

8. A process of degrading an aliphatic hydrocarbon which comprises subjecting a heated mixture of said hydrocarbon and water to the action of a positive column rare gas lamp operating at a potential upwards of 15,000 volts, and at a temperature upwards to 400° C., until the hydrocarbon is degraded.

9. A process of degrading an aliphatic hydrocarbon which comprises subjecting a heated mixture of said hydrocarbon and water to the action of a positive column neon lamp operating at a potential upwards of 15,000 volts, and at a temperature upwards to 400° C., until the hydrocarbon is degraded.

10. A continuous process of degrading an aliphatic hydrocarbon which comprises passing a heated mixture of said hydrocarbon and water both in vapor form continuously over a positive column rare gas lamp operating at a potential upwards of 15,000 volts, and at a temperature upwards to 400° C., at a rate such that said hydrocarbon is degraded.

11. A continuous process of degrading an aliphatic hydrocarbon which comprises passing a heated mixture of said hydrocarbon and water both in vapor form continuously over a positive column neon lamp operating at a potential upwards of 15,000 volts, and a temperature upwards to 400° C., at a rate such that said hydrocarbon is degraded.

12. A continuous process of degrading an aliphatic hydrocarbon which comprises passing a heated mixture of said hydrocarbon and water both in vapor form continuously over a positive column rare gas lamp operating at a potential upwards of 15,000 volts, and at a temperature upwards to 400° C., at a rate such that said hydrocarbon is degraded, and under a partial vacuum.

13. A continuous process of degrading an aliphatic hydrocarbon which comprises passing a heated mixture of said hydrocarbon and water both in vapor form continuously over a positive column neon lamp operating at a potential upwards of 15,000 volts, and at a temperature upwards to 400° C., at a rate such that said hydrocarbon is degraded, and under a partial vacuum.

14. A continuous process of degrading an aliphatic hydrocarbon which comprises passing a heated mixture of said hydrocarbon and water both in vapor form continuously over a positive column rare gas lamp operating at a potential upwards of 15,000 volts, and at a temperature upwards to 400° C., at a rate such that said hydrocarbon is degraded, and under a pressure of about 200 mm. mercury.

15. A process on converting an aliphatic hydrocarbon into an oxygenated compound which comprises subjecting said hydrocarbon in the presence of a catalytic material containing a per-compound belonging to the group consisting of a perborate, a persulfate, a percarbonate, a bichromate and hydrogen peroxide to the action of radiations from a rare gas lamp operating at a potential upwards of 1,000 volts at about atmospheric temperature and for a period sufficient to effect conversion.

16. A process of converting an aliphatic hydrocarbon into an alcohol which comprises subjecting said hydrocarbon in the presence of water and an oxidizing catalytic material containing a per-compound belonging to the group consisting of a perborate, a persulfate, a percarbonate, a bichromate and hydrogen peroxide to the action of a positive column rare gas lamp operating at a potential upwards of 1,000 volts at about atmospheric temperature and for a period sufficient to effect conversion.

17. A process of converting an aliphatic hydrocarbon into an alcohol which comprises subjecting said hydrocarbon in the presence of water and an oxidizing catalytic material containing a per-compound belonging to the group consisting of a perborate, a persulfate, a percarbonate, a bichromate and hydrogen peroxide to the action of a positive column neon lamp operating at a potential upwards of 1,000 volts at about atmospheric temperature and for a period sufficient to effect conversion.

18. A process of converting an aliphatic hydrocarbon into an alcohol which comprises subjecting said hydrocarbon in the presence of water and an oxidizing catalytic material to the action of a positive column neon lamp operating at a potential upward of 1,000 volts at about atmospheric temperature and for a period sufficient to effect conversion, said catalytic material being composed of an insoluble granular porous substance impregnated with a per-compound belonging to the group consisting of a perborate, a persulfate, a percarbonate, a bichromate and hydrogen peroxide.

19. A process of converting an aliphatic hydrocarbon into an alcohol which comprises subjecting said hydrocarbon in the presence of water and an oxidizing catalytic material to the action of a positive column neon lamp operating at a potential upwards of 1,000 volts at about atmospheric temperature and for a period sufficient to effect conversion, said catalytic material being composed of active carbon impregnated with a per-compound belonging to the group consisting of a perborate, a persulfate, a percarbonate, a bichromate and hydrogen peroxide.

20. A process of converting an aliphatic hydrocarbon into an alcohol which comprises subjecting said hydrocarbon in the presence of water and an oxidizing catalytic material to the action of a positive column neon lamp operating at a potential upwards of 1,000 volts at about atmospheric temperature and for a period sufficient to effect conversion, said catalytic material being composed of granular active carbon impregnated with a per-compound belonging to the group consisting of a perborate, a persulfate, a percarbonate, a bichromate and hydrogen peroxide in a colloidal state.

21. A process of converting an aliphatic hydrocarbon into an alcohol which comprises subjecting said hydrocarbon in the presence of water and an oxidizing catalytic material to the action of a positive column neon lamp operating at a potential upwards of 1,000 volts at about atmospheric temperature and for a period sufficient to effect conversion, said catalytic material being composed of granular active carbon impregnated with a colloidal mixture of a material of the empirical class consisting of agar-agar, gum arabic, glue and glucose and with an oxidizing agent of the empirical class consisting of a perborate, a perchlorate, a persulfate, a percarbonate, a bichromate, and hydrogen peroxide.

22. A process of converting an aliphatic hydrocarbon into an alcohol which comprises subjecting said hydrocarbon in the presence of water and an oxidizing catalytic material to the action of a positive column neon lamp, said catalytic material being composed of an insoluble porous substance impregnated with a mixture of copper hydroxide, copper carbonate and a small amount of copper sulphate.

23. A process of converting an aliphatic hydrocarbon into an alcohol which comprises subjecting said hydrocarbon in the presence of water and an oxidizing catalytic material to the action of a positive column neon lamp, said catalytic material being composed of broken pumice stone impregnated with a colloidal mixture of copper hydroxide, copper carbonate and a small amount of copper sulphate.

24. A process of converting an aliphatic hydrocarbon into an alcohol which comprises subjecting said hydrocarbon in the presence of water and an oxidizing catalytic material to the action of a positive column neon lamp, said catalytic material being composed of metallized broken pumice stone impregnated with a colloidal mixture of copper hydroxide, copper carbonate and a small amount of copper sulphate.

25. A process of converting an aliphatic hydrocarbon into an alcohol which comprises subjecting said hydrocarbon in the presence of water and an oxidizing catalytic material to the action of a positive column neon lamp, said catalytic material being composed of metallized broken pumice stone impregnated with a colloidal mixture of copper hydroxide, copper carbonate and a small amount of copper sulphate, said metallized pumice stone being prepared by depositing thereon a mixture of copper hydroxide, copper carbonate and a small amount of copper sulphate, thereafter heating the mass to produce copper oxide, and while hot reducing the copper oxide by treatment with methyl alcohol vapor; the metallized pumice stone being subsequently impregnated.

26. A process of converting an aliphatic hydrocarbon into an alcohol which comprises subjecting said hydrocarbon in the presence of water and an oxidizing catalytic material to the action of a positive column neon lamp, said catalytic material being composed of metallized broken pumice stone prepared impregnating with a colloidal mixture of copper hydroxide, copper carbonate and a small amount of copper sulphate and subsequently reducing to metallic copper, impregnated with an oxidizing material of the empirical class consisting of a perborate, a perchlorate, a persulfate, a percarbonate, a bichromate and hydrogen peroxide.

27. A catalytic material for the conversion of an aliphatic hydrocarbon into an oxygenated compound consisting of an insoluble porous substance impregnated with a per-compound belonging to the group consisting of a perborate, a persulfate, a percarbonate, a bichromate and hydrogen peroxide.

28. A catalytic material for the conversion of an aliphatic hydrocarbon into an oxygenated compound consisting of a granular active carbon impregnated with a per-compound belonging to the group consisting of a perborate, a persulfate, a percarbonate, a bichromate and hydrogen peroxide in a colloidal state.

29. A catalytic material for the conversion of an aliphatic hydrocarbon into an oxygenated compound consisting of a granular active carbon impregnated with a colloidal mixture containing an oxidizing agent of the class consisting of a perborate, a perchlorate, a persulfate, a percarbonate, a bichromate and hydrogen peroxide.

30. A catalytic material for the conversion of an aliphatic hydrocarbon into an oxygenated compound consisting of an insoluble granular porous substance impregnated with a mixture of copper hydroxide, copper carbonate and a small amount of copper sulphate.

31. A catalytic material for the conversion of an aliphatic hydrocarbon into an oxygenated compound consisting of metallized pumice stone impregnated with a colloidal mixture of copper hydroxide, copper carbonate and a small amount of copper sulphate.

32. A catalytic material for the conversion of an aliphatic hydrocarbon into an oxygenated compound consisting of metallized pumice stone, prepared by impregnating with a colloidal mixture of copper hydroxide, copper carbonate and a small amount of copper sulphate and subsequently reducing to metallic copper, and impregnated with a substance of the class consisting of a perborate, a perchlorate, a persulfate, a percarbonate, a bichromate and hydrogen peroxide.

33. A catalytic material for the conversion of an aliphatic hydrocarbon into an oxygenated compound consisting of granular active carbon impregnated with a colloidal mixture of a material of the class consisting of agar-agar, gum arabic, glue and glucose and with a substance of the class consisting of a perborate, a persulfate, a percarbonate, a bichromate and hydrogen peroxide.

34. In a process of effecting chemical conversion of hydrocarbons the step which comprises assembling desired ingredients including a hydrocarbon under reacting conditions and under the influence of radiations from a rare gas tube.

35. In a process of effecting chemical conversion of hydrocarbons the step which comprises assembling desired ingredients including a hydrocarbon in the presence of a catalyst containing a per-compound belonging to the class consisting of a perborate, a percarbonate, a bichromate and hydrogen peroxide and under the influence of radiations from a positive column rare gas tube.

WALDEMAR O. MITSCHERLING.